United States Patent [19]

Mokler

[11] Patent Number: 5,460,361
[45] Date of Patent: Oct. 24, 1995

[54] SHEET STACKER WITH BRAKE

[75] Inventor: Bernhard Mokler, Böblingen, Germany

[73] Assignee: LTG Lufttechnische Gesellschaft mit beschrankter Haftung, Stuttgart, Germany

[21] Appl. No.: 238,616

[22] Filed: May 5, 1994

[30] Foreign Application Priority Data

May 5, 1993 [DE] Germany .......................... 43 14 760.7

[51] Int. Cl.⁶ .................................................. B65H 29/68
[52] U.S. Cl. ........................................ 271/183; 271/211
[58] Field of Search ...................................... 271/183, 211

[56] References Cited

U.S. PATENT DOCUMENTS

| | | | |
|---|---|---|---|
| 4,221,377 | 9/1980 | Bodewein et al. ........................ | 271/183 |
| 5,133,542 | 7/1992 | von Kwiatkowski et al. .......... | 271/183 |

*Primary Examiner*—William E. Terrell
*Assistant Examiner*—Carol L. Druzbick
*Attorney, Agent, or Firm*—Herbert Dubno; Andrew Wilford

[57] ABSTRACT

Sheets that arrive one after another in a horizontal travel direction at a relatively high input speed at an input station are stacked by first displacing the sheets transversely downward as they pass the input station, and then braking the downwardly displaced sheets so that they move in the direction at an output speed that is substantially lower than the input speed. The sheets are then stopped so that they settle downward on a stack in the bin. Since the sheets move downward somewhat before they are braked, the trailing edge of the braked sheet is below the leading edge of the following sheet. In other words a leading edge of a sheet passing through the input station extends in the direction downstream past a trailing edge of the sheet is braked. The sheets are braked by gripping their trailing edges and retarding their downstream movement. This gripping can be effected by suction or, in the case of ferromagnetic sheets, magnetically. The sheets are stopped by engaging their leading edges by a downstream side of a stacking bin. An air cushion is formed under the braked sheets so they settle gently downward onto the stack. Similarly an air cushion is formed above the braked sheets and under the sheets in the input station. The air cushions are formed by projecting jets of air downstream in the direction between the sheets.

13 Claims, 4 Drawing Sheets

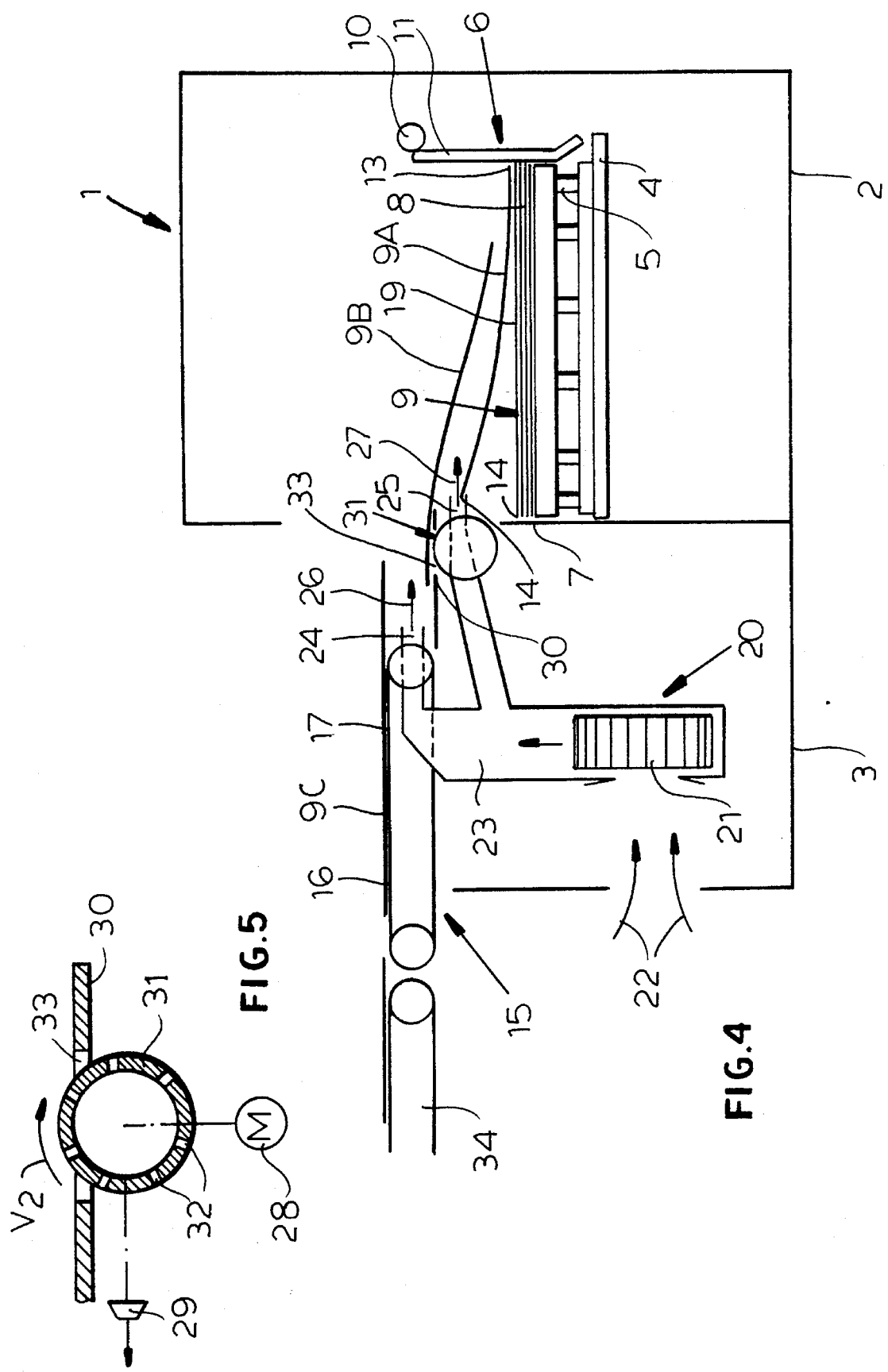

SHEET STACKER WITH BRAKE

FIELD OF THE INVENTION

The present invention relates to a sheet stacker. More particularly this invention concerns an apparatus for forming a neat stack of sheets that are delivered to it one at a time at high speed.

BACKGROUND OF THE INVENTION

A big manufacturing operation can produce 6000 to 10,000 sheets per hour, for instance thin metal sheets that are painted and dried. These sheets are stacked on pallets for shipping. The sheet stacker must take the individual sheets as they arrive at high speed and position them accurately on the top of the stack without damaging the sheets in any way.

Normally the sheets are transported at their high delivery speed on a conveyor belt that projects them against a horizontally deflectable bumper that defines the downstream end of their travel and of the pile. Thus the leading edge of the sheet butts the bumper and then the sheet settles down onto the stack.

Due to the high speed at which the sheets are transported, they strike with some force against the bumper. This can damage their leading edges. In addition the sheets can rebound somewhat so they do not drop down and form a neat stack.

OBJECTS OF THE INVENTION

It is therefore an object of the present invention to provide an improved sheet stacker.

Another object is the provision of such an improved sheet stacker which overcomes the above-given disadvantages, that is which takes the rapidly arriving sheets and forms them into a neat stack without damage to the sheets, and without the sheets touching each other substantially until they actually settle onto the stack.

SUMMARY OF THE INVENTION

Sheets that arrive one after another in a horizontal travel direction at a relatively high input speed at an input station are stacked by first displacing the sheets transversely downward as they pass the input station, and then braking the downwardly displaced sheets so that they move in the direction at an output speed that is substantially lower than the input speed. The sheets are then stopped so that they settle downward on a stack in a bin.

Since the sheets move downward somewhat before they are braked, the trailing edge of the braked sheet is below the leading edge of the following sheet. In other words a leading edge of a sheet passing through the input station extends in the direction downstream past a trailing edge of the sheet is braked. This gives a shingled or overlapping effect so that the braking, which makes it possible to deposit the sheet on the stack without damaging it and with great accuracy, does not affect the incoming flow of sheets.

The sheets are braked according to this invention by gripping their trailing edges and retarding their downstream movement. This gripping can be effected by suction or, in the case of ferromagnetic sheets, magnetically. The sheets are stopped by engaging their leading edges by a downstream side of a stacking bin.

According to a further feature of the invention an air cushion is formed under the braked sheets so they settle gently downward onto the stack. Similarly an air cushion is formed above the braked sheets and under the sheets in the input station. The air cushions are formed by projecting jets of air downstream in the direction between the sheets. In fact according to the invention the use of jets directed downstream creates a low-pressure zone immediately at the nozzles so that the trailing edges of the sheets, once they pass the nozzles, are drawn suddenly downward. This enhances engagement of the sheets with the brake.

The brake according to this invention can include a horizontal brake plate immediately downstream of and below the input station and below the compressed-air jet. The brake element is at the plate. Thus the trailing edges of the sheets are drawn by the low pressure down onto this plate where they are gripped and braked. The brake plate is horizontal and parallel to the direction and the brake plate is above an uppermost surface of the stack.

When according to this invention there are upper and lower jets, the sheets are accurately moved downward while being maintained out of contact with each other. In fact in such a system at one instant during the stacking operation the shingling is three deep, with the trailing edge of the frontmost sheet that is just settling on the stack under the rear half of the sheet following it whose trailing edge is behind the leading edge of the sheet trailing it.

BRIEF DESCRIPTION OF THE DRAWING

The above and other objects, features, and advantages will become more readily apparent from the following description, reference being made to the accompanying drawing in which:

FIGS. 2 through 4 are views like FIG. 1 showing the apparatus in successive steps of stacking a sheet; and FIG. 5 is a mainly schematic view of a detail of the apparatus.

SPECIFIC DESCRIPTION

Figure 1:
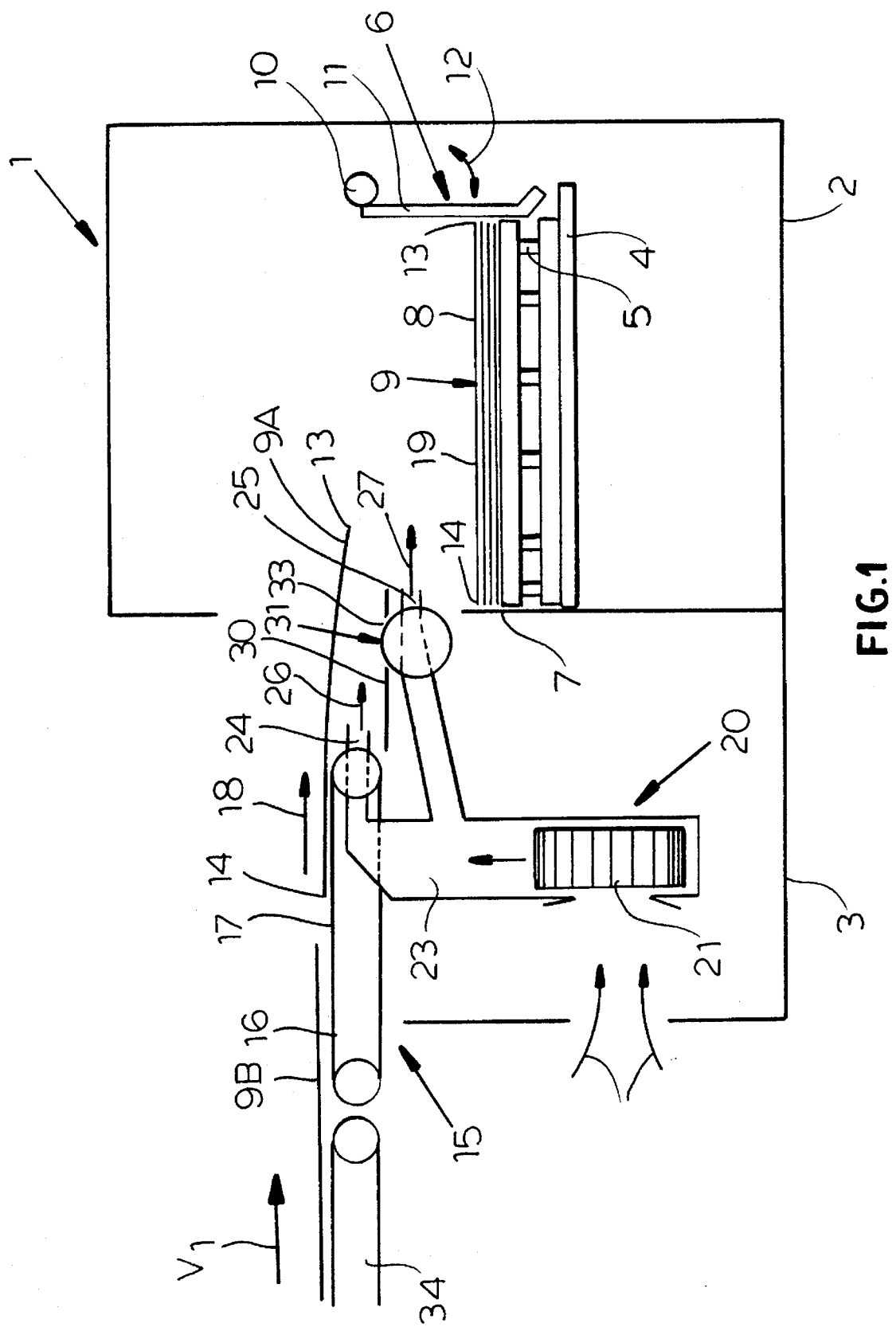
FIG. 1 is a small-scale partly diagrammatic side view of the apparatus according to the invention.

As seen in FIG. 1 a stacker 1 according to this invention has a bin 2 with a vertically displaceable floor 4 supporting a pallet 5 on which is a stack 8 of sheets 9, the stack 8 having a horizontal and planar upper surface 19. The sheets 9 have, relative to a travel direction 18, leading edges 13 that lie in the stack 8 against a downstream wall 6 and trailing edges 14 that touch an upstream partition wall 7 of the bin 2. The downstream wall 6 is actually formed by an array of horizontally spaced and vertically extending bars 11 extending downward from a horizontal roller or bar 10 that can pivot normally against against a spring force about its horizontal axis so that the wall 6 is actually somewhat deflectable downstream as indicated by arrow 12.

The sheets 9 are fed in at a high speed $V_1$ at a rate of two or three a second by an input conveyor 34 and a transfer conveyor 15 both operating at the same speed. The transfer conveyor 15 is formed, like the conveyor 34, of a conveyor belt 16 having a planar and horizontal upper surface 17 that is above the upper surface 19 of the stack 8. The stack upper surface 19 is always at the same level because the floor 4 moves down as the stack 8 gets bigger.

A housing 3 attached to the bin 2 contains a blower assembly 20 having a fan 21 that takes in air as indicated by arrows 22 and outputs it to a manifold 23 that in turn is connected to upper and lower slit nozzles 24 and 25 that emit jets 26 and 27 that are projected horizontally downstream in the direction 18 parallel to the plane 17. The upper jet 26 is positioned just under the plane 17 immediately downstream of the downstream end of the conveyor 15 and the lower jet 27 is emitted between a brake 31 at a horizontal plate 30 that itself is positioned below the jet 26 and the upper surface 19 of the stack 8.

As better seen in FIG. 5, this plate 30 is formed with a vertically throughgoing and horizontally elongated slot 33 through which projects a vacuum braking drum 31. The surface of this drum 31 is formed with radially throughgoing perforations 32 and its interior is evacuated by a blower 29. In addition it is rotated by a motor 28 at a peripheral speed $V_2$ that is different from the speed $V_1$ the sheets 9 are moving at. The drum 31 can be rotated so that its exposed upper edge moves in the same direction as the sheets 9, but substantially more slowly, or it can even be rotated in the opposite direction.

The system described above operates as follows:

As seen in FIG. 1 a leading sheet 9A moving in the direction 18 is advanced so far that its leading half is projecting horizontally past the downstream end of the transfer conveyor 15, and this sheet 9A is followed by another sheet 9B at a small spacing that is a small fraction of the sheet length. The leading half of the sheet 9A is supported on an air cushion created by the jet 26.

Figure 2:
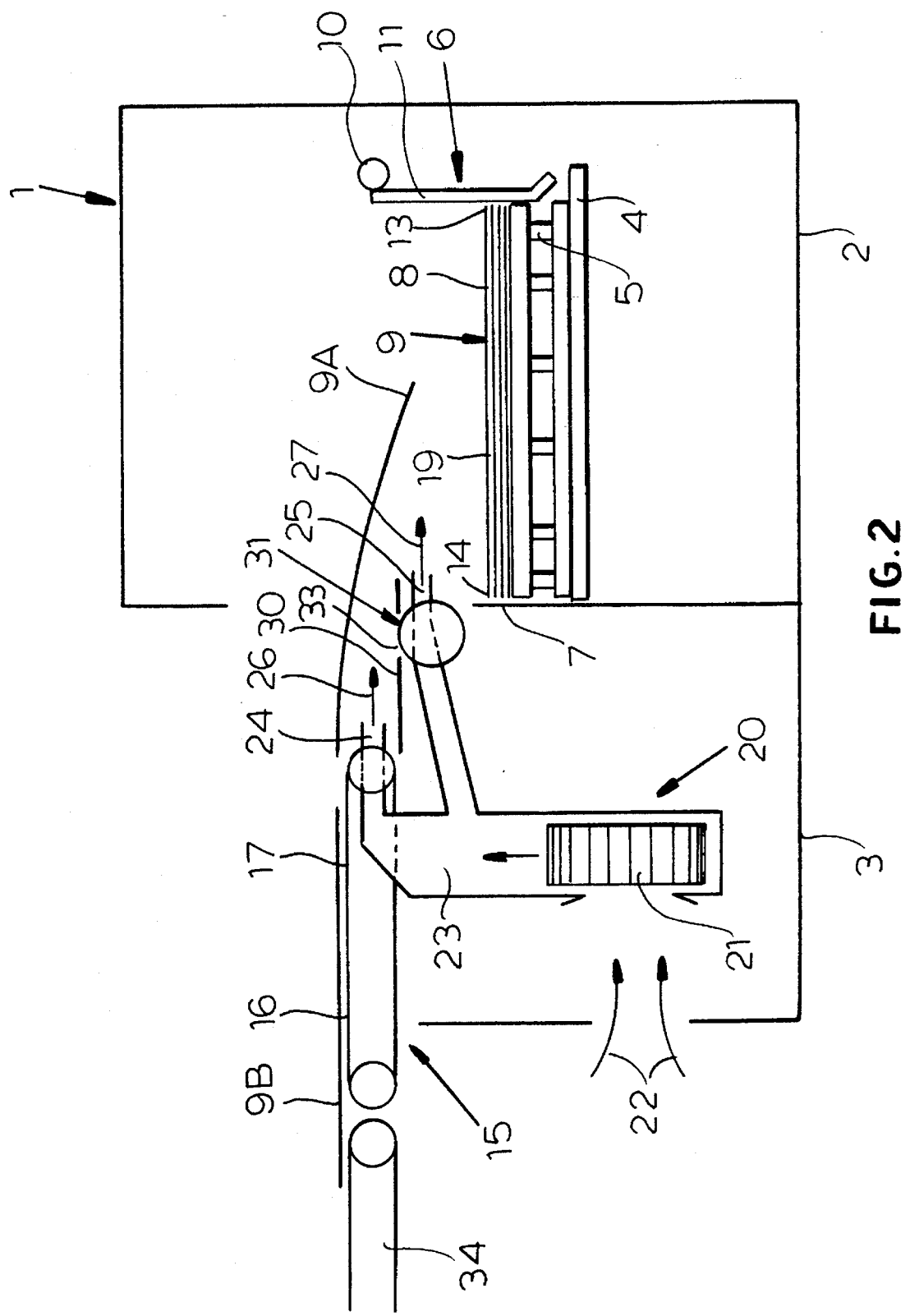

Once the trailing edge 14 of the sheet 9A moves past the downstream end of the conveyor 15 as shown in FIG. 2 the sheet 9A will start to move downward. Its leading portion will be supported on the air cushion from the jet 27 and its trailing edge by the cushion of the jet 26.

Figure 3:
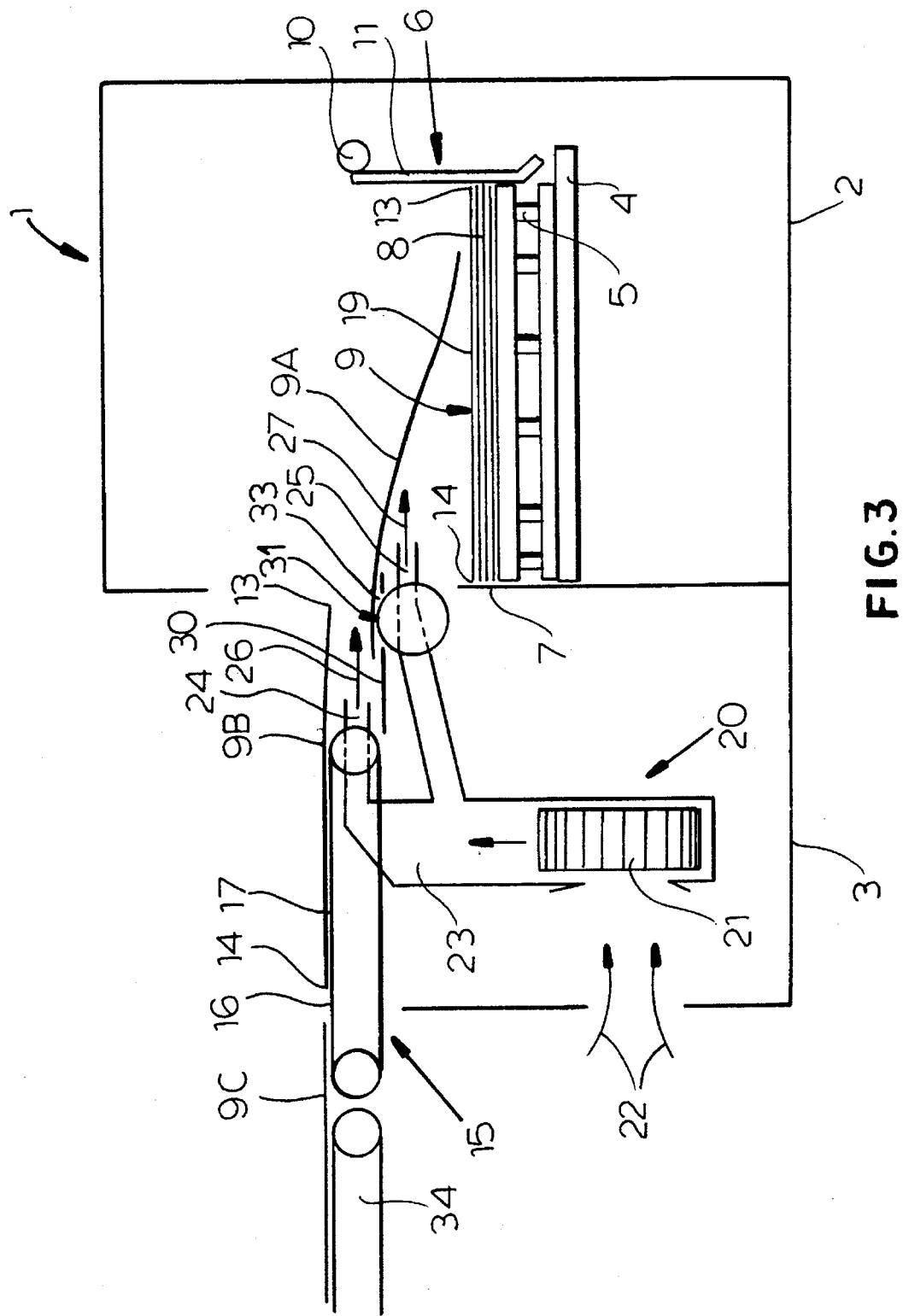

Then as shown in FIG. 3 the trailing edge 13 of the sheet 9A will be impelled down by the pressure region formed right at the jet 26 to drop on the plate 30 where it will engage the brake 31 which will substantially slow its forward impetus. This will in fact slow the sheet 9A so much that the leading edge 13 of the following sheet 9B will move forward past it, but spaced above it due to the cushion created by the jet 26.

Finally as seen in FIG. 4 the trailing edge 14 of the leading sheet 9A moves downstream past the brake plate 30 and it settles gently down on the top of the stack 8, with its leading edge 13 butting the downstream side 6. Meanwhile the following sheet 9B is in position on the brake 31 and is being slowed, and is kept out of contact with the sheet 9A by the air cushion of the jet 27. In addition a following sheet 9C by this time has advanced so its leading edge 13 is ahead in the direction 18 of the trailing edge 14 of the sheet 9B.

Thus there is a shingled effect created by the jets 26 and 27 and by the brake 31 that allows the rapidly moving sheets to be slowed sufficiently that they can be stacked neatly and accurately, without damaging them at all.

I claim:

1. A method of stacking sheets that arrive spaced apart one after another in a horizontal travel direction at a relatively high input speed at an input station, the method comprising the steps of:

displacing each of the sheets transversely downward as it passes the input station;

braking the downwardly displaced sheets so that they move in the direction at an output speed that is substantially lower than the input speed and so that each sheet following a downwardly moving sheet has a leading edge that overlaps a trailing edge of the downwardly moving sheet;

stopping the braked sheets so that the stopped sheets settle downward on a stack in the bin; and maintaining each of the downwardly moving sheets out of contact with the respective following sheet until they are stopped by projecting a jet of air downstream from the input station parallel to the travel direction at each of the downwardly moving sheets so as to form an upper cushion between the downwardly moving sheet and the respective following sheet.

2. The stacking method defined in claim 1 wherein the sheets are braked by gripping their trailing edges and retarding their downstream movement.

3. The stacking method defined in claim 1 wherein the sheets are stopped by engaging their leading edges by a downstream side of a stacking bin.

4. The stacking method defined in claim 1, further comprising the step of forming a lower air cushion under the braked sheets between same and the stack so the sheets settle gently downward onto the stack.

5. An apparatus for stacking sheets, the apparatus comprising:

means including a transfer conveyor for delivering the sheets spaced apart and one after another in a horizontal travel direction at a relatively high input speed to an input station and for projecting the sheets horizontally at the input speed in the direction substantially without support as they leave the input station, whereby the sheets are pulled by gravity transversely downward as they leave the input station;

brake means engageable with the downwardly displaced sheets after they leave the input station for retarding advance of the sheets in the direction so that they move in the direction at an output speed that is substantially lower than the input speed and so that each sheet following a downwardly moving sheet has a leading edge that overlaps a trailing edge of the respective downwardly moving sheet;

collecting means downstream of the input station for stopping the braked sheets so that the stopped sheets settle downward on a stack; and blower means for projecting a jet of air downstream from the input station parallel to the travel direction at each of the downwardly moving sheets so as to form an upper cushion between the downwardly moving sheet and the respective following sheet for maintaining each of the downwardly moving sheets out of contact with the respective following sheet.

6. The stacking apparatus defined in claim 5 wherein the blower means includes a nozzle directing the jet of air downstream from the input station and thereby drawing down trailing edges of the sheets as they leave the station.

7. The stacking apparatus defined in claim 6 wherein the brake means includes a brake element immediately downstream of and below the input station, below the air jet, and positioned to engage the sheets as same are drawn down by the air jet.

8. The stacking apparatus defined in claim 7, further comprising a horizontal brake plate immediately downstream of and below the input station and below the air jet, the brake element being at the plate.

9. The stacking apparatus defined in claim 8 wherein the brake element is level with the brake plate.

10. The stacking apparatus defined in claim 8 wherein the brake plate is horizontal and parallel to the direction.

11. The stacking apparatus defined in claim 8 wherein the brake plate is above an uppermost surface of the stack.

12. The stacking apparatus defined in claim 5 wherein the jet from the lower nozzle is directed to draw down trailing edges of the sheets as they leave the brake means.

13. The stacking apparatus defined in claim 5 wherein the blower means includes a lower nozzle directing another jet of compressed air downstream from the input station below the brake means and above an upper surface of the stack.

* * * * *